Jan. 25, 1949.  W. R. TUCKER  2,459,902
HYDRAULIC OPERATING CIRCUIT FOR MACHINE TOOLS
Filed Feb. 20, 1947  2 Sheets-Sheet 1

INVENTOR
WARREN R. TUCKER
BY
Toulmin & Toulmin
ATTORNEYS

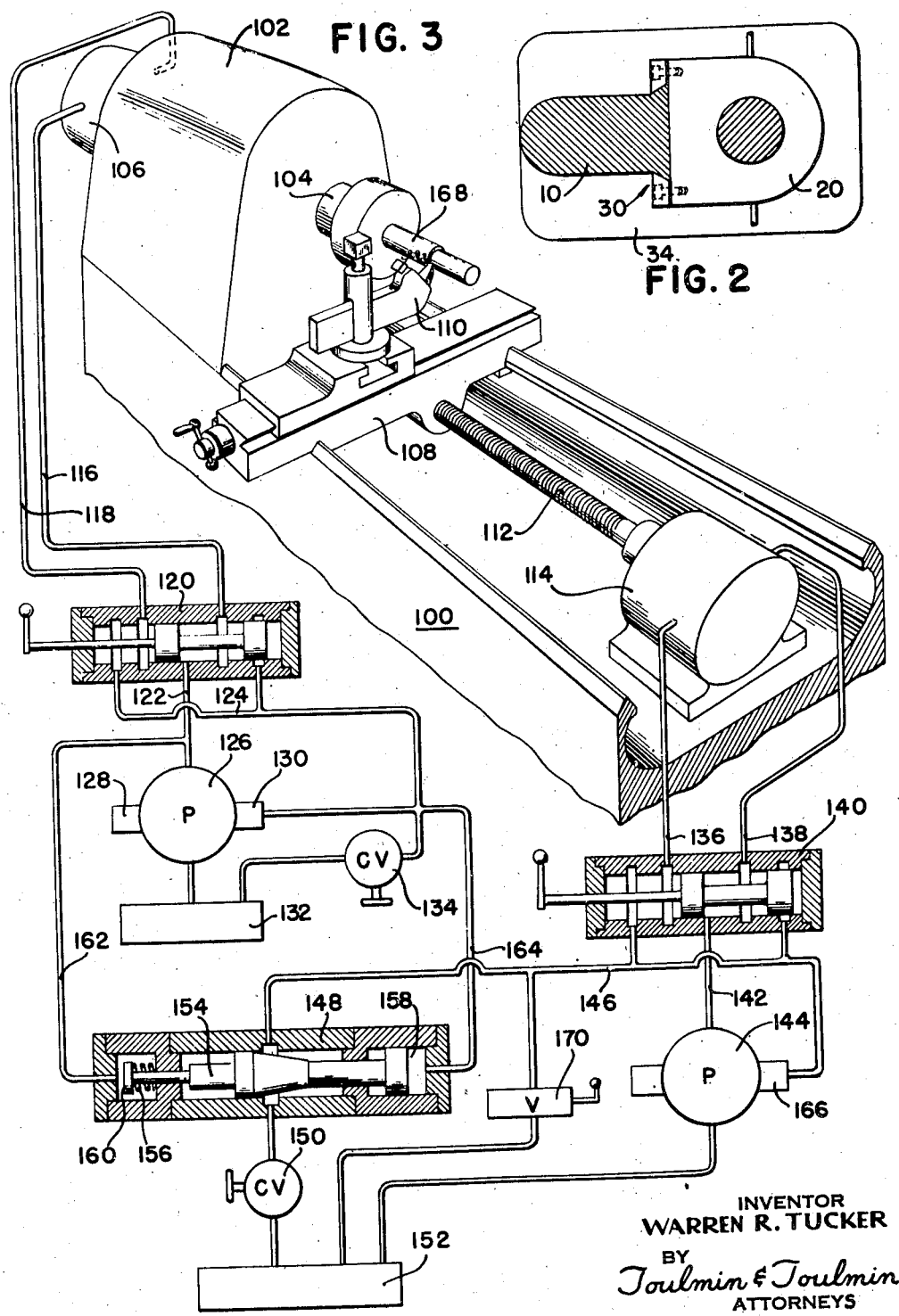

Patented Jan. 25, 1949

2,459,902

UNITED STATES PATENT OFFICE 2,459,902

HYDRAULIC OPERATING CIRCUIT FOR MACHINE TOOLS

Warren R. Tucker, Dayton, Ohio, assignor to H-P-M Development Corporation, Wilmington, Del., a corporation of Delaware Application February 20, 1947, Serial No. 729,782

9 Claims. (Cl. 77—32)

This invention relates to machine tools, and particularly to fluid operable actuating circuits for machine tools.

In machine tools when work members are cut to predetermined sizes, there are generally two movements; the relative movement between the cutting member and the workpiece, and a feeding movement by which the cutter and workpiece are advanced together. In most instances the first mentioned movement is carried out at a rate of speed which is determined by the characteristics of the cutter being employed and the material being cut thereby.

This speed of movement is generally known as the cutting speed and is fairly well determined for any particular combination of tool and material.

The feeding movement is the movement of the tool into or along the work as, for example, the advancing of a drill axially into a workpiece, or the movement of a lathe tool longitudinally along the workpiece. Generally, it is desirable that the feeding movement be carried out at a maximum rate of speed for economical production.

However, if the feeding movement is carried at too high a rate of speed then the cutting efficiency of the tool decreases and it has a tendency to tear the material being worked or to dig into the said material and to stall either the tool or the work, whichever is in motion to produce the cutting movement.

The particular object of the present invention is to automatically determine the optimum feed rate for a machine tool in which there is a cutting member operating on a workpiece.

A still further object of this invention is to provide a hydraulic actuating circuit for a machine tool wherein the rate of travel of the tool and workpiece relatively in the feeding direction is automatically determined by the resistance which the tool encounters in cutting the work.

A further object is the provision of a feed driving motor for a machine tool such that the rate of feed will be diminished, and may even be reversed, when the load on the tool exceeds a predetermined amount.

It is also an object of this invention to provide a machine tool having hydraulically operated spindle and feed motors wherein the speed of at least one thereof is selectively adjustable, and the speed of at least the feed motor is responsive to loads acting on the spindle motor.

It is also an object of this invention to provide a method of operating a machine tool which leads to the most economical working conditions and which is adaptable to a plurality of types of machines.

These and other objects and advantages will become more apparent upon reference to the following description taken in connection with the accompanying drawings in which:

Figure 2 is a plan section indicated by the line 2—2 on Figure 1 and showing the means for keying the drill press column against rotation during its reciprocatory movements; and Figure 3 is a diagrammatic view showing a lathe type tool having an actuating circuit according to this invention.

General arrangement

Figure 1:
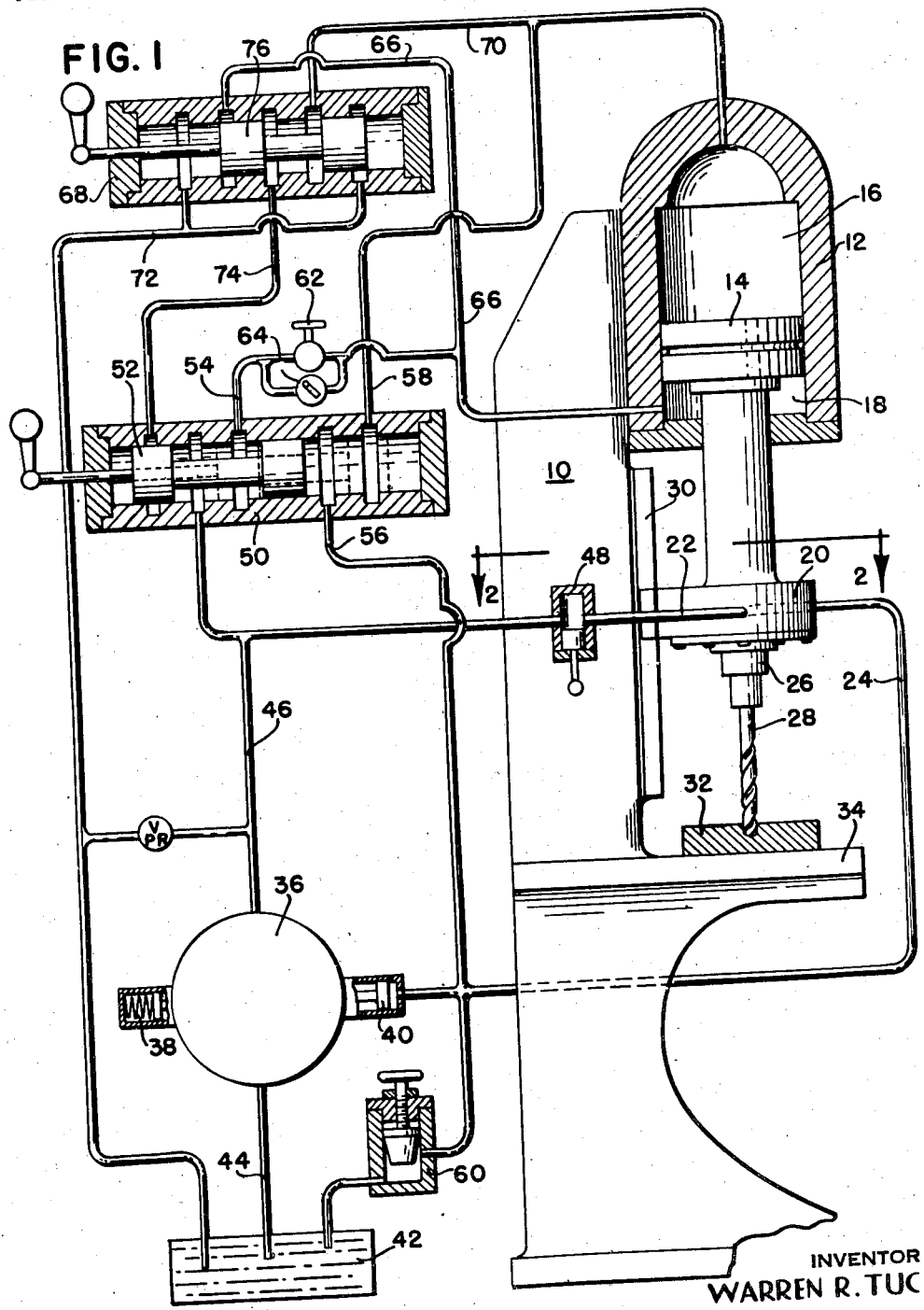
Figure 1 is a diagrammatic view of a drill press having an actuating circuit according to this invention.

In general, a machine tool adapted for being operated by an actuating circuit according to this invention, and to practice the methods of operation thereof, comprises a first motor adapted for rotating either the tool or the work to be cut, and a second motor adapted for moving the said tool and work relatively in a feed direction.

According to this invention, a fluid source of variable delivery is connected to drive the first motor. The rate of fluid flow from the spindle motor is utilized for adjusting the delivery of the fluid source thereto in order to maintain the speed of operation of the said spindle motor substantially constant.

The rate of flow through the spindle motor is also utilized for controlling the delivery of fluid to the feeding motor in its feeding direction either through valve mechanism or by directly biasing the said motor. The delivery pressure to the spindle motor is utilized for controlling the supply of fluid to the feed motor in its retracting direction, also either by valve mechanism or by directly biasing the said motor. Thus, the rate of movement of the feed motor is determined by the pressure drop across the spindle motor and, as the said drop increases, indicating an increase in load on the spindle motor, the rate of movement of the feed motor decreases, and may even cease or be reversed.

According to the first embodiment of this invention the spindle motor is mounted on a reciprocating ram and the ram has advancing and retracting means which form the feed motor.

According to another embodiment both the spindle and feed motors are rotary and are independently mounted as, for example, in a lathe. Preferably, a single fluid source is used for actuating both motors but there may be employed, as shown in connection with the second modification, separate fluid sources for the two motors with the delivery to the feed motor from its source being controlled by the pressure drop across the spindle motor.

Structural arrangement of the first embodiment

Referring to Figure 1, there is shown a drill press type machine tool having a frame 10 at the upper end of which is mounted a cylinder 12 within which reciprocates the ram 14 forming with the said cylinder the ram advancing means 16 and the ram retracting means 18. On the lower end of the ram there is carried a rotary spindle motor 20 to which fluid is supplied under pressure by a conduit 22 and from which fluid is conducted to exhaust by a conduit 24. The motor 20 has the rotatable element 26 which is adapted for mounting a tool as, for example, the drill 28. For preventing rotation of the ram due to the rotative action of the motor 20, there may be key means indicated at 30 and best shown in Figure 2 which guides the ram in pure reciprocatory movements in the machine tool frame.

The drill 28 is adapted for operating on a workpiece 32 which is suitably carried on a workpiece support 34 rigid with the frame 10.

A fluid source at 36 supplies actuating fluid to the spindle and feed motors and is continuously urged toward maximum delivery position by a spring 38 and also has a piston 40 adapted in response to pressure conveyed thereto to counteract the spring 38 and to move the source toward reduced delivery position. The fluid source draws actuating fluid from the tank 42 through a conduit 44 and discharges fluid under pressure into the conduit 46. The conduit 46 is connected directly with the conduit 22 through a shut-off valve 48 and is also connected with one port of a selector valve 50.

The valve 50 includes a movable valve member 52 which may be positioned, as shown, to interconnect the conduit 46 with the conduit 54 while also interconnecting the conduits 56 and 58. The conduit 56 leads to the inlet of an adjustable choke valve 60 which discharges to the tank 42. The inlet of the choke valve 60 is also connected with the conduit 24 and the plunger 40 of the fluid source 36.

Returning to the valve 50, the conduit 54 is connected with the feed motor retracting means 18 through the adjustable choke valve 62 and the check valve 64 which bypasses the said choke valve toward the said retracting means. Between the said choke and check valves and the retracting means 18, there is a branch conduit 66 leading to a reversing valve 68. The conduit 58 leads from the valve 50 to the feed motor advancing means 16 and has a branch conduit 70 also leading to the reversing valve 68.

The said reversing valve has exhaust connections as at 72 leading directly to the tank 42, and a pressure inlet port which is connected by a conduit 74 with the selector valve 50. The reversing valve 68 has a valve member 76 therein movable selectively into position to connect either of the conduits 70 or 66 with the conduit 74 while connecting the other thereof with the exhaust conduit 72, or into an intermediate position wherein both the conduits 70 and 66 are disconnected.

The valve member 52 of the selector valve 50, when moved into position to interconnect the conduits 56 and 58, also connects the conduit 74 with the pressure conduit 46 to provide a supply of pressure fluid to the reversing valve 68.

Operation of the first embodiment

In operation, let it be assumed that all of the valves are in the position shown in Figure 1 and that the spindle motor 20 is operating to drive the drill 28 in rotation. The delivery of the fluid source to the spindle motor is regulated by the pressure standing in the conduit 24 due to the restriction to fluid flow therethrough offered by the choke valve 60. This pressure acts on the plunger 40 and varies the delivery of the fluid source 36 so that the speed of operation of the spindle motor 20 is substantially constant. Adjustments for different types of material, different tools, etc., may be made by adjusting the valve member of the valve 60.

The pressure in the conduit 46, which is the pressure standing on the working side of the motor 20 is also conveyed through the valve 50, conduit 54 and check valve 64 to the retracting means 18 of the ram 14. The pressure at the inlet of the choke 60 which is the pressure at the exhaust side of the motor 20 and also the pressure acting on the plunger 40, is conveyed through the conduit 56, the valve 50 and the conduit 58 to the advancing means 16 of the ram 14.

Inasmuch as the advancing means 16 has a substantially greater area than the retracting means 18, the ram will be biased downwardly in its feed direction. During the downward movement of the ram fluid expelled from the retracting means thereof will pass through the choke valve 62 and the setting thereof will determine the speed of the feeding movement of the ram.

If the load on the tool increases due to an excessive feed rate, the motor 20 will tend to slow down thereby increasing the pressure in the conduit 46 and decreasing the pressure in the conduit 24. This brings about a decrease in pressure in the advancing means 16 of the ram 14 and an increase in pressure in the retracting means 18 thereof and the feeding movement of the said ram is reduced. If the rise in pressure in the conduit 46 is rapid, the ram 14 may even retract upwardly to disengage the tool from the work.

If, on the other hand, the load on the spindle motor 20 is light, then there will be a correspondingly low pressure in the conduit 46 and the downward movement of the ram 14 will be increased.

If at any time it is desired to halt the rotation of the motor 20, the valve 48 may be moved into its closed position to interrupt the supply of pressure fluid to the said motor. Should it be desired to reciprocate the ram 14 manually in order initially to position the tool relative to the work, or to retract the tool from the work, the valve member 52 of the valve 50 is moved into its right-hand position whereupon the pressure conduit 46 is connected with the conduit 74 and the conduits 54 and 58 are closed off from the conduits 46 and 56. Thereafter, in the customary manner, the reversing valve 68 may be actuated to drive the motor 14 in the desired direction.

It will be seen that the circuit described above provides for an automatic control of the said return of the feed motor, that the spindle speed is selectively adjustable to the desired speed, and that excessive loads on the spindle motor are accompanied by an immediate reduction in feed rate or a retraction of the tool from the work.

Structural arrangement of the second embodiment

In Figure 3 there is shown a lathe type machine tool having a bed 100 having a headstock 102 including the rotatable spindle 104 which is powered by the rotary fluid motor 106. Slidably mounted on the bed is a carriage 108 adapted for mounting the cutting tool 110 in the usual manner, and being driven in reciprocation by the screw 112 which is powered by the rotary feed motor 114.

The spindle motor 102 has connected therewith the supply and return conduits 116 and 118 which lead to the service ports of a reversing valve 120 which is shiftable selectively to connect either of the said service ports with the pressure line 122 while connecting the other of the said service ports with the exhaust conduit 124.

The conduit 122 receives pressure fluid from the source 126 which is variable, as in the case of the fluid source 36 of the first embodiment, by a spring at 128, the action of which is opposed by the pressure responsive means at 130. The conduit 124 discharges to the tank 132 through a choke valve 134, the inlet of which is connected with the fluid pressure responsive means 130. The feed motor 114 likewise has supply and return conduits 136 and 138 which are connected with the service ports of a reversing valve 140 to which pressure fluid is supplied by a conduit 142 leading to a fluid source 144. The reversing valve 140 also has an exhaust conduit 146 connected therewith which leads to the inlet port of a metering or variable restrictor valve 148. The discharge port of the valve 148 is connected with the inlet of an adjustable choke valve 150 which discharges into a tank 152.

Within the valve 148 is a valve member 154 movable for varying the restriction offered by the said valve. There is a spring 156 which continuously urges the valve toward a position of lesser restriction and which is assisted in its action by a larger operating area at 158, and opposed in its action by a smaller operating area at 160. The area at 160 is connected by a conduit 162 to receive fluid from the discharge side of the source 126.

It will be apparent that this pressure is always that which is acting on the inlet side of the spindle motor 106. The operating area 158 is connected by a conduit 164 with the inlet of a choke valve 134 to receive pressure fluid therefrom and it will also be apparent that this pressure is always that which is on the discharge side of the spindle motor 106.

The delivery of the fluid source 144 may be controlled in response to the pressure in the conduit 146, as by the fluid pressure responsive means 166 associated with the said source, if desired.

Operation of the second embodiment

In operation, let it be assumed that the tool 110 has been brought into engagement with the workpiece 168 supported by the spindle 104, and that the fluid sources 126 and 144 are delivering fluid to their respective motors 106 and 114 in the proper directions as determined by the settings of the reversing valves 120 and 140. As in the case of the fluid source 36 and the spindle motor 20 of the first embodiment, the speed of operation of the spindle motor 106 is substantially constant due to the control of the delivery of the fluid source 126 thereto as determined by the setting of the choke valve 134 and the operation of the spring 128 and pressure responsive means 130 to the pressure created thereby.

The rate of speed of the feed motor 114 will be determined by the rate of fluid flow therethrough which, in turn, is determined by the settings of the restrictor valves 148 and 150. Restrictor valve 150 is pre-set to determine the desirable rate of feed of the tool into the work, and the restrictor valve 148 is automatically responsive to the pressure difference standing across the spindle motor 106.

As the pressure difference across the said spindle motor increases, due either to an increase in inlet pressure or a decrease in discharge pressure, or both, the valve member 154 will move rightwardly to increase the throttling action of the valve 148 and to reduce the speed of the motor 114. Similarly, a reduction in the pressure drop across the motor 106 will be accompanied by a movement of the valve member 154 to reduce the restriction of the valve 148 and to permit the feed motor 114 to operate at high speed. Thus, the speed of the said motor 114 is inversely proportional to the load on the spindle motor 106 and operates to maintain the feed of the tool into the work at the maximum possible rate.

For driving the feed motor 114 independently of the spindle, there may be provided a valve 170 which is connected between the conduit 146 and the tank 152 and which bypasses the restrictor valves 148 and 150 to permit free discharge from the motor 114. By opening the valve 170, the exhaust from the motor 114 is conducted freely to exhaust and, by manipulation of the reversing valve 140 the carriage 108 may be rapidly traversed to any desired position on the bed 100.

It will be seen that the operation of the second embodiment of this invention is quite similar to that of the first embodiment in that a cutting speed can be pre-selected by adjusting the speed of the spindle motor, and thereafter the feed rate of the tool into the work will be a function of the load encountered by the spindle motor. Additionally, an adjustment of the speed of the feed can be obtained by adjusting the restrictor valve 150. Also, either of the spindle or feed motors can be operated independently of the others for pre-positioning the tool, for changing tools and workpiece, etc., as the machine operator desires.

It will be understood that this invention is susceptible to modification in order to adopt it to different usages and conditions and, accordingly, it is desired to comprehend such modifications within this invention as may fall within the scope of the appended claims.

I claim:

1. In combination; a first fluid motor having an inlet and an outlet; a fluid source connected with said inlet; means of maintaining a predetermined minimum pressure at said outlet; a reciprocable ram having a larger advancing area and a smaller retracting area; means hydraulically connecting said advancing area with said outlet and said retracting area with said inlet; and means responsive to variations in pressure at said outlet for varying the delivery of said fluid source.

2. In a fluid operable circuit; a fluid source of variable delivery and a first fluid motor connected in series; means throttling the discharge from said first motor to maintain a predetermined pressure at the outlet thereof; means responsive to said predetermined pressure for controlling the delivery of said source; a reciprocable ram having a larger advancing area and a smaller retracting area; means hydraulically connecting said retracting area with the inlet of said first motor and said advancing area with the outlet thereof; and valve means selectively movable for permitting actuation of said ram by fluid from said source.

3. In a fluid operable circuit; a fluid source of variable delivery and a first fluid motor connected in series; means throttling the discharge from said first motor to maintain a predetermined pressure at the outlet thereof; means responsive to said predetermined pressure for controlling the delivery of said source; a reciprocable ram having a larger advancing area and a smaller retracting area; means hydraulically connecting said retracting area with the inlet of said first motor and said advancing area with the outlet thereof; first valve means selectively movable to disconnect said advancing and retracting areas from said outlet and inlet; and second valve means selectively movable for connecting either of said advancing or retracting means with said fluid source while connecting the other thereof with exhaust.

4. In a machine tool; a rotary fluid motor having an inlet and an outlet; a reciprocating fluid motor having a larger advancing area and a smaller retracting area and supporting said rotary motor; a fluid source of variable delivery serially connected with said rotary motor; a restrictor in the discharge of said rotary motor to maintain a predetermined pressure at the outlet thereof; means responsive to said pressure for controlling the delivery of said source; and means hydraulically connecting said outlet with said advancing area and said inlet with said restricting area.

5. In a boring machine; a work support for supporting a workpiece to be bored; a spindle reciprocable toward and from said work support; a rotary fluid motor mounted for driving said spindle; a reciprocating fluid motor having a larger advancing area and a smaller retracting area mounted for reciprocating said spindle; a fluid source serially connected with said rotary motor; means to maintain a predetermined discharge pressure at the outlet of said rotary motor; means responsive to said discharge pressure for biasing said reciprocating motor in its advancing direction; and means responsive to the pressure at the inlet of said rotary motor for biasing said reciprocating motor in its retracting direction.

6. In a boring machine; a work support for supporting a workpiece to be bored; a spindle reciprocable toward and from said work support; a rotary fluid motor mounted for driving said spindle; a reciprocating fluid motor having a larger advancing area and a smaller retracting area mounted for reciprocating said spindle; a fluid source serially connected with said rotary motor; means to maintain a predetermined discharge pressure at the outlet of said rotary motor; means responsive to said discharge pressure for controlling the delivery of said fluid source; means connecting said retracting area with the discharge side of said source; and means connecting said advancing area with the discharge side of said rotary motor.

7. In combination; a first fluid motor; a first fluid source for supplying said first motor; a restrictor in the discharge side of said first motor for maintaining a pressure at the outlet thereof; means responsive to said pressure for controlling the rate of delivery of said first source to said first motor; a second fluid motor; a second source for supplying fluid to said second motor; a variable restrictor in the discharge line of said second motor; and means responsive to increases in load on said first motor for moving said restrictor toward increased restriction position; and to decreases in load on said first motor for moving said restrictor toward decreased restriction position.

8. In combination; a first fluid motor and fluid source connected in series; a reversing valve for controlling the direction of movement of said first motor; means of controlling the delivery from said first source to maintain the speed of said first motor substantially constant; a second fluid motor and a second fluid source connected in series; a reversing valve for determining the direction of movement of said second motor; a restrictor in the discharge line from said second motor; and means responsive to increases in loads on said first motor for moving said restrictor toward increased restriction position and to decreases in loads on said first motor for moving said restrictor toward decreased restriction position.

9. In combination; a first fluid motor and fluid source connected in series; a reversing valve for controlling the direction of movement of said first motor; means of controlling the delivery from said first source to maintain the speed of said first motor substantially constant; a second fluid motor and a second fluid source connected in series; a reversing valve for determining the direction of movement of said second motor; a restrictor in the discharge line from said second motor; means responsive to increases in loads on said first motor for moving said restrictor toward increased restriction position and to decreases in loads on said first motor for moving said restrictor toward decreased restriction position; and valve means selectively movable for bypassing said restrictor to permit full speed operation of said second motor.

WARREN R. TUCKER.

REFERENCES CITED

The following references are of record in the file of this patent:

UNITED STATES PATENTS

| Number | Name | Date |
|---|---|---|
| 1,911,132 | Macomber | May 23, 1933 |
| 1,911,138 | Clute et al. | May 23, 1933 |
| 2,005,018 | West | June 18, 1935 |
| 2,079,640 | Vickers | May 11, 1937 |
| 2,098,213 | Benedek | Nov. 9, 1937 |
| 2,169,470 | Miller et al. | Aug. 15, 1939 |
| 2,389,368 | King | Nov. 20, 1945 |
| 2,406,482 | Tucker | Aug. 27, 1946 |

FOREIGN PATENTS

| Number | Country | Date |
|---|---|---|
| 612,638 | Germany | Apr. 30, 1935 |